United States Patent
Lee

(10) Patent No.: US 10,290,850 B2
(45) Date of Patent: May 14, 2019

(54) BATTERY MODULE INCLUDING A BUS BAR AND A PLURALITY OF CONNECTED BATTERY PACKS

(71) Applicant: Samsung SDI Co., Ltd., Yongin-si, Gyeonggi-do (KR)

(72) Inventor: Daepyo Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 418 days.

(21) Appl. No.: 15/167,362

(22) Filed: May 27, 2016

(65) Prior Publication Data
US 2016/0351881 A1   Dec. 1, 2016

(30) Foreign Application Priority Data
May 29, 2015 (KR) .................... 10-2015-0076545

(51) Int. Cl.
*H01M 10/46* (2006.01)
*H01M 2/20* (2006.01)
*H01M 2/30* (2006.01)

(52) U.S. Cl.
CPC ............. *H01M 2/202* (2013.01); *H01M 2/30* (2013.01)

(58) Field of Classification Search
CPC ........ H02J 7/0042; H02J 7/355; H02J 7/0013; H01M 2/206; H01M 10/482; H01M 2/02
USPC ....... 320/107, 112, 116; 429/96, 97, 99, 100
See application file for complete search history.

(56) References Cited

U.S. PATENT DOCUMENTS

| | | | | |
|---|---|---|---|---|
| 2014/0057152 A1* | 2/2014 | Furuya | .................. | H01M 2/206 429/121 |
| 2014/0120407 A1* | 5/2014 | Hofer | .................... | H01M 2/206 429/159 |
| 2014/0139185 A1* | 5/2014 | Han | ....................... | H02J 7/0029 320/118 |
| 2015/0263394 A1* | 9/2015 | Yoshioka | ............ | H01M 2/1077 429/90 |
| 2015/0280193 A1* | 10/2015 | Ohshiba | ................... | H01M 2/16 429/53 |
| 2015/0349390 A1* | 12/2015 | Aiba | ................... | H01M 2/1077 429/90 |
| 2016/0254515 A1* | 9/2016 | Shimoda | ............... | H01M 2/206 429/61 |

FOREIGN PATENT DOCUMENTS

| | | | |
|---|---|---|---|
| JP | 2010-033913 | A | 2/2010 |
| KR | 2008-0013040 | A | 2/2008 |
| KR | 2010-0114595 | A | 10/2010 |
| KR | 2011-0062384 | A | 6/2011 |
| KR | 2014-0008123 | A | 1/2014 |

* cited by examiner

Primary Examiner — Edward Tso
(74) Attorney, Agent, or Firm — Knobbe Martens Olson & Bear LLP

(57) ABSTRACT

Provided is a battery module including a bus bar and a plurality of battery packs electrically connected to each other by the bus bar, wherein each of the battery packs includes a case in which a first guide for guiding an assembly position of the bus bar is formed, and the first guide extends in a first direction around a terminal. According to one or more embodiments, there is provided a battery module including a guide for guiding an assembly position of a bus bar in a structure of binding together a plurality of battery packs using the bus bar, thereby facilitating binding the battery packs together and preventing faulty binding.

20 Claims, 5 Drawing Sheets

BATTERY MODULE INCLUDING A BUS BAR AND A PLURALITY OF CONNECTED BATTERY PACKS

RELATED APPLICATIONS

This application claims the benefit of Korean Patent Application No. 10-2015-0076545, filed on May 29, 2015, in the Korean Intellectual Property Office, the disclosure of which is incorporated herein in its entirety by reference.

BACKGROUND

Field

One or more exemplary embodiments relate to a battery module.

Description of the Related Art

In general, a secondary battery is rechargeable and dischargeable unlike a primary battery, which is not rechargeable. The secondary battery is used as an energy source of mobile devices, electric vehicles, hybrid vehicles, electric bicycles, uninterruptible power supplies, and the like, and depending on a type of an external device using the secondary battery, the secondary battery may be as a single battery or a battery module obtained by grouping a plurality of secondary batteries.

Although a small mobile device such as a mobile phone may operate using an output and capacity of a single battery during a predetermined time period, an electric vehicle, a hybrid vehicle, or the like that require a great amount of power and are driven over a long time period prefer a battery pack due to an output and capacity issue, and an output voltage or an output current supplied by the battery pack may increase according to the number of embedded battery cells.

SUMMARY OF CERTAIN INVENTIVE ASPECTS

One or more exemplary embodiments include a battery module including a guide for guiding an assembly position of a bus bar in a structure of binding together a plurality of battery packs using the bus bar, thereby facilitating binding the battery packs together and preventing faulty binding.

Additional aspects will be set forth in part in the description which follows and, in part, will be apparent from the description, or may be learned by practice of the presented embodiments.

According to one or more exemplary embodiments, a battery module includes a bus bar, and a plurality of battery packs electrically connected to each other by the bus bar, wherein each of the battery packs includes a case in which a first guide for guiding an assembly position of the bus bar is formed, and the first guide extends in a first direction around a terminal.

The terminal may include a pair of first and second terminals having different polarities from each other, and the first guide may include inner first guides at inner sides of the pair of first and second terminals.

The inner first guides may be paired at the inner side of the first terminal and the inner side of the second terminal.

The first guide may further include outer first guides at outer sides of the pair of first and second terminals.

The outer first guides may be paired at the outer side of the first terminal and the outer side of the second terminal.

The first guide may integrally protrude from an upper surface of a battery pack in which the terminal is formed.

When an upper surface of the battery pack in which the terminal is formed is in the form of a rectangle including a pair of short side portions and a pair of long side portions, the first direction may be a direction of the short side portions.

The battery module may further include, when the terminal includes a pair of first and second terminals having different polarities from each other, a second guide extending, in a direction of the long side portions, between the first and second terminals.

The first and second guides may be in the form of lines extending perpendicularly to each other, and the bus bar may interconnect the battery packs neighboring each other along a bent pattern with guides of the first and second guides.

The bus bar may be provided in plural, and an assembly position of at least one selected from the plurality of bus bars may be regulated by guides of the first and second guides.

The bus bar may include a pair of coupling pieces respectively coupled to terminals of the battery packs different from each other, and a connection piece between the pair of coupling pieces.

The coupling pieces may be laid flat with respect to an upper surface of the battery pack, and the connection piece may stand upright vertically with respect to the upper surface of the battery pack.

In a state of being laid flat, the coupling pieces may be pressed between the terminal of the battery pack and an engagement member engaged with the terminal.

In a state where the connection piece stands upright vertically, an assembly position of the connection piece may be regulated by the first guide.

The battery module may further include a master pack for controlling recharging and discharging operations of the battery packs, wherein the master pack may be electrically connected to the battery packs and thus disposed in recharging and discharging routes.

The battery packs may have substantially identical structures, and the master pack may be formed in an external size that is the same as that of the battery pack.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
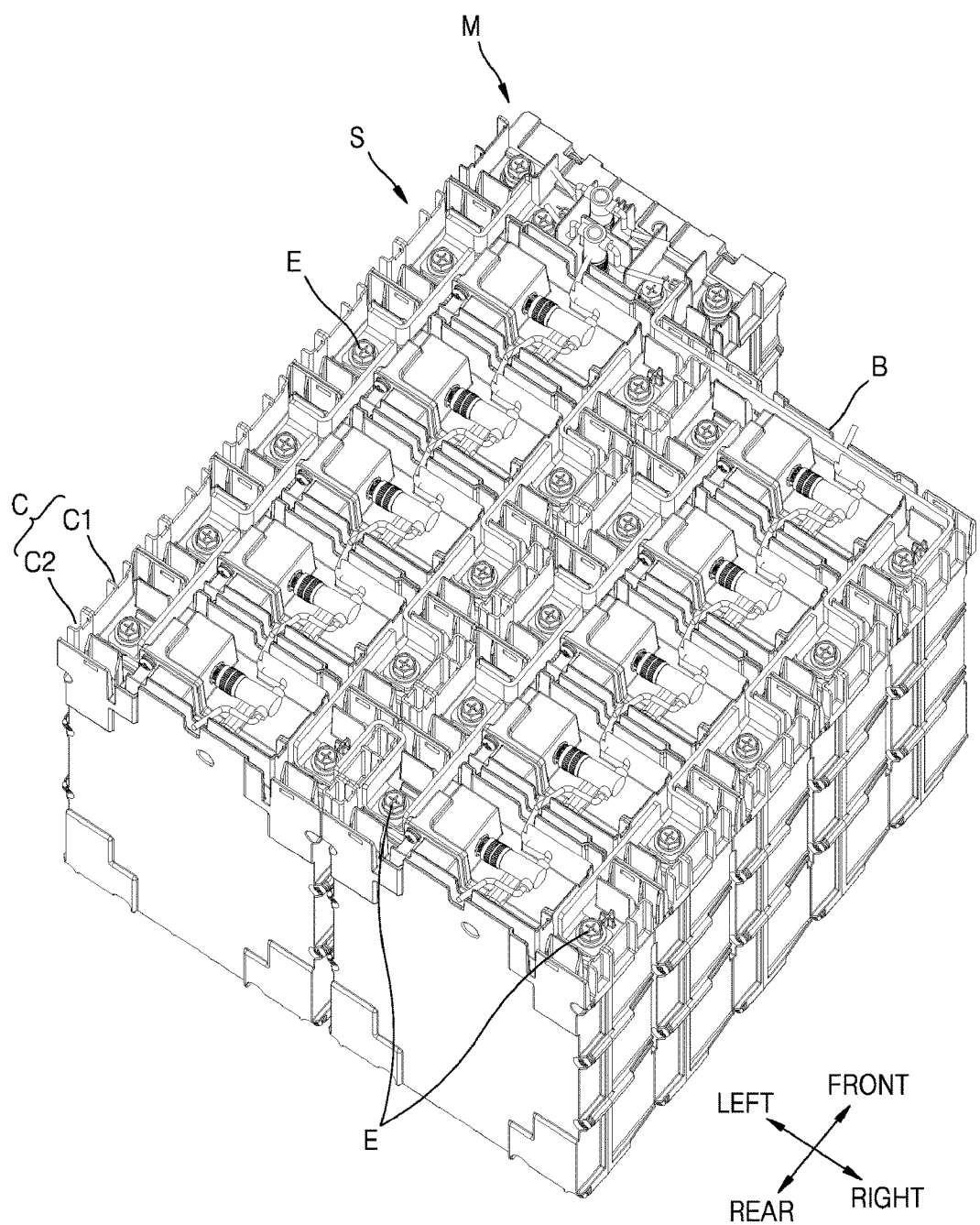
FIG. 1 is a perspective view of a battery module according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. The term "and/or"

used herein includes any and all combinations of one or more of the associated listed items. The singular forms "a," "an," and "the" used herein are intended to include the plural forms as well, unless the context clearly indicates otherwise.

Hereinafter, a battery module according to an exemplary embodiment will be described with reference to the accompanying drawings.

Figure 2:
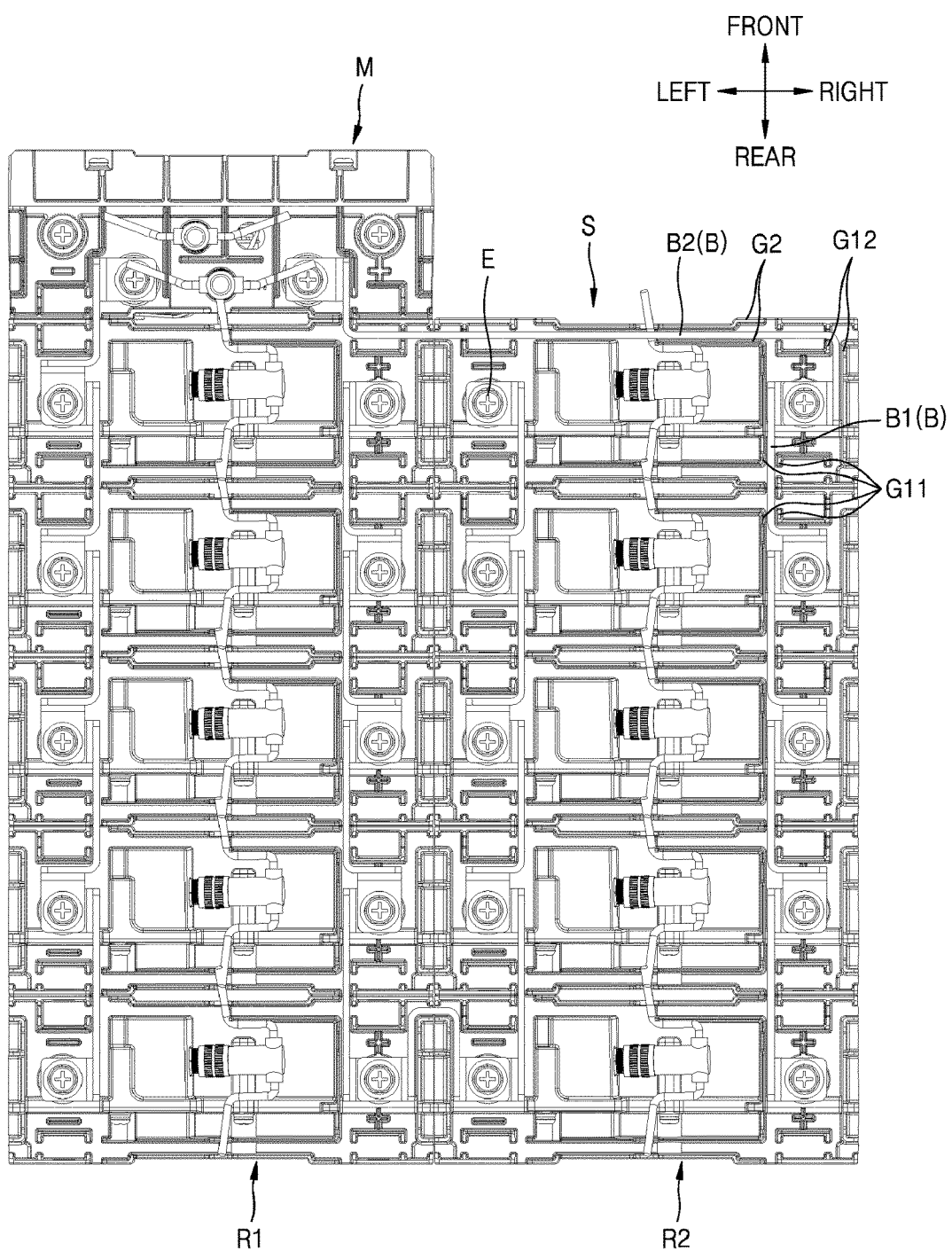
FIG. 2 illustrates a connection structure of a battery pack.
Figure 3:
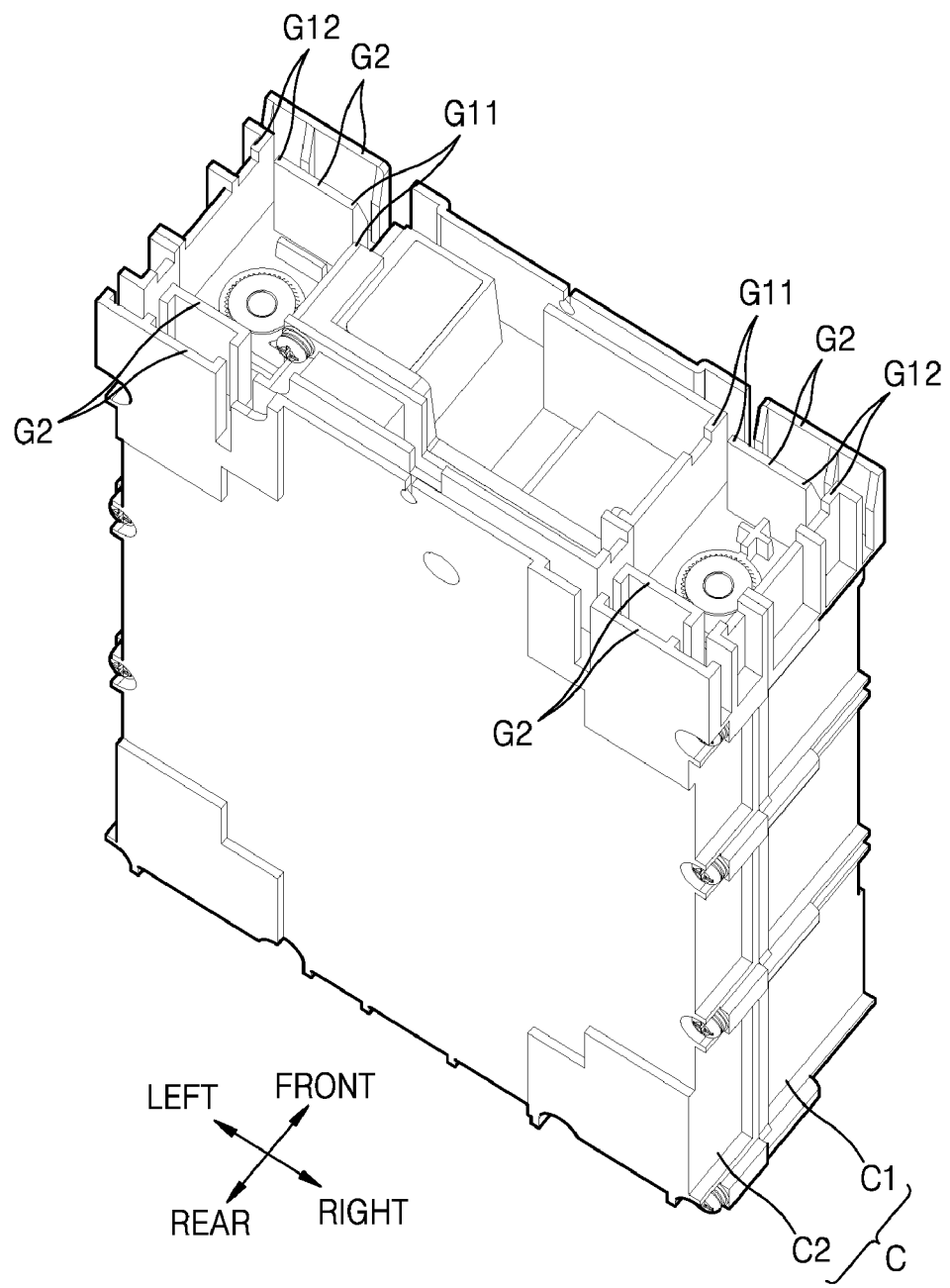
FIG. 3 is a perspective view of a battery pack of FIG. 1.
Figure 4:
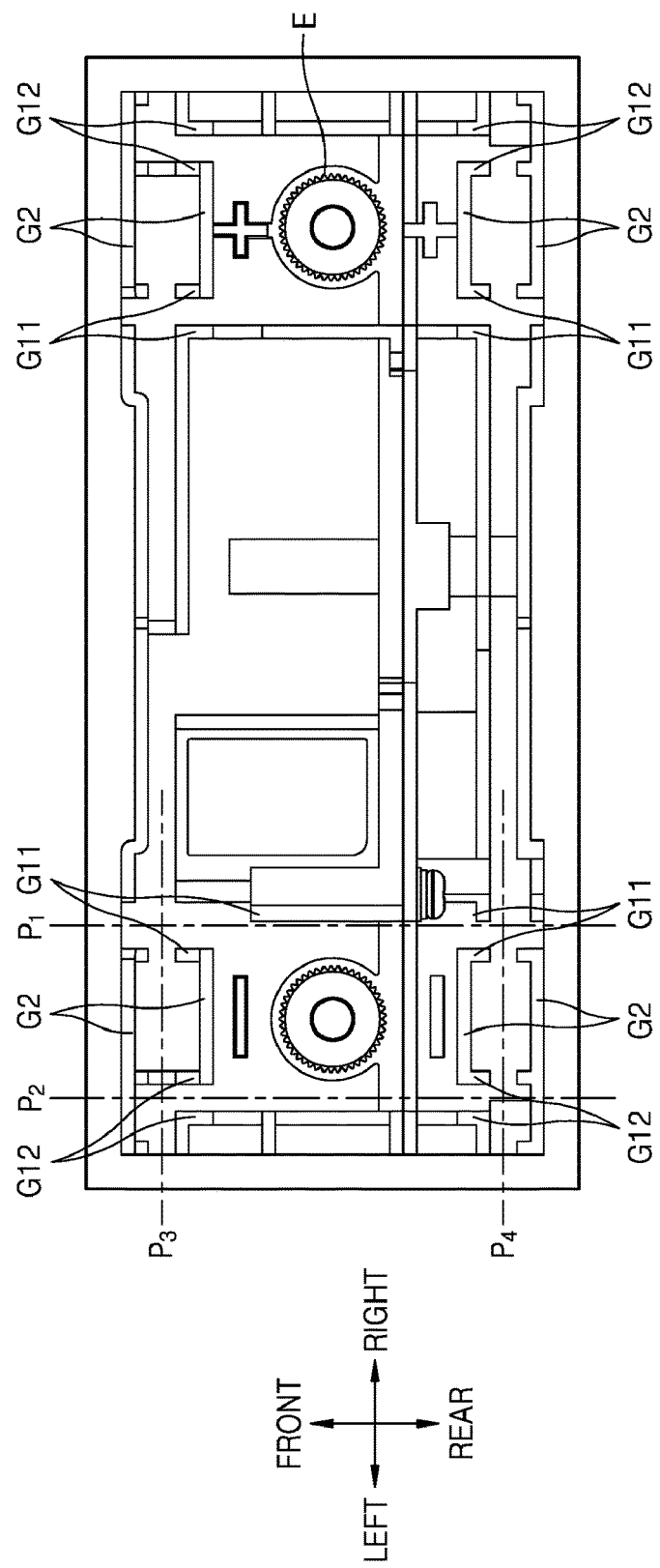
FIG. 4 illustrates a guide structure of a battery pack of FIG. 3.
Figure 5:
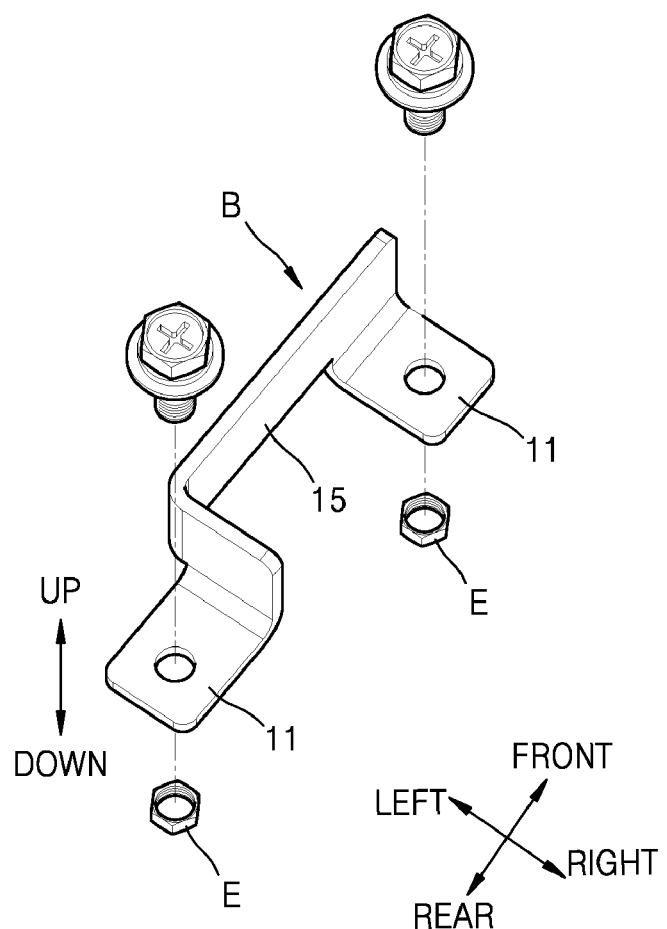
FIG. 5 is a perspective view of a structure of a bus bar of FIG. 1.

FIG. 1 is a perspective view of a battery module according to an exemplary embodiment. FIG. 2 illustrates a connection structure of a battery pack. FIG. 3 is a perspective view of the battery pack of FIG. 1. FIG. 4 illustrates a guide structure of the battery pack of FIG. 3. FIG. 5 is a perspective view of a structure of a bus bar of FIG. 1.

Referring to FIGS. 1 and 2, the battery module may include a plurality of battery packs S and a master pack M connected to the battery packs S and configured to control recharging and discharging operations of the battery packs S.

The battery packs S may be electrically connected to each other, and may be electrically connected to each other in series, in parallel, or by using a combined method including serial and parallel connections.

In an embodiment of FIG. 1, the battery module may include 10 battery packs S electrically connected to each other, and a master pack M for controlling recharging and discharging operations of the battery packs S. However, the technical scope of the inventive concept is not limited to the above-described number of battery packs S. The number of battery packs S may be increased according to required electrical output capability.

In detail, according to the present exemplary embodiment, as the number of battery packs S is increased, the battery module may be extended for use as a high output. For example, the battery module may be extended such that the battery packs S are connected together using the battery pack S as one unit.

According to the present exemplary embodiment, as the battery packs S having substantially the same structure are connected to each other, output performance may be multiplied. In this regard, as the battery packs S have substantially the same structure, the battery module may be flexible in responding to various output demands. For example, for a use requiring a relatively low output, a relatively small number of battery packs S may be connected to each other to supply a battery module having a low output. For a use requiring a relatively high output, a relatively large number of battery packs S may be connected to each other to supply a battery module having a high output. Various output demands may be actively coped with like this, and manufacturing efficiency may also be increased through the battery packs S having substantially the same structure. Further, overlapping investment in design, manufacturing facilities, and the like for the battery packs S having different structures according to output demands may be reduced.

According to the present exemplary embodiment, the battery packs S may have substantially the same structure. In this regard, the battery packs S having substantially the same structure may be understood as battery packs S each having substantially the same shape, and further, as battery packs S each not having completely the same shape but having largely the same structure. For example, although each of the battery packs S may have differences in some parts including a coupling portion, the same design may be largely applied to each of the battery pack S. In the embodiment of FIG. 1, the same design may be applied to every portion of each of the battery packs S.

Each of the battery packs S may include a plurality of battery cells (not shown), and a case C where the battery cells are held and a terminal E as an input-output port is exposed. For example, each of the battery packs S may include the same number of battery cells (not shown), and may have substantially the same structure and shape. The terminal E may include a + terminal and a – terminal having different polarities from each other.

Referring to FIGS. 1 and 2, the battery module may include a bus bar B electrically connecting the battery packs S different from each other. For example, the bus bar B may electrically connect the battery packs S neighboring each other by connecting the terminals E of the battery packs S neighboring each other. For example, the bus bar B may connect the battery packs S neighboring each other in parallel by electrically interconnecting the terminals E of identical polarities of the battery packs S neighboring each other, and may connect the battery packs S neighboring each other in series by electrically interconnecting the terminals E of different polarities of the battery packs S neighboring each other. Serial or parallel connections of the battery packs S by using the bus bar B will be described in detail later.

Referring to FIG. 5, the bus bar B may be in the form of a metal plate. For example, in a comparative example of the present exemplary embodiment, the battery packs S different from each other may be connected by using a flexible wire. In the case that the battery packs S are connected by using a wire, a thickness of the wire needs to be increased in order to withstand recharging or discharging current of a high magnitude. Accordingly, assembling convenience may decrease, and it may be difficult to standardize a form of the wire for increasing capacity. Also, the flexible wire requires an extra component for fixing an assembly position of its own.

In the present exemplary embodiment, the bus bar B in the form of a metal plate may be used, thereby decreasing resistance in a recharging or discharging pass and facilitating standardizing a form of the bus bar B. Also, an extra component for extra fixation is not required, and the battery packs S may be fixed to each other sufficiently by coupling the terminals E of the battery packs S neighboring each other.

Referring to FIG. 5, the bus bar B may include coupling pieces 11 positioned at both ends thereof and configured to be coupled to the terminals E of the battery packs S neighboring each other, and a connection piece 15 forming recharging or discharging pass between the coupling pieces 11. The coupling pieces 11 and the connection piece 15 are disposed in different manners. The coupling pieces 11 may be coupled to the battery packs S by engagement members to be engaged with the terminals E of the battery packs S while being inserted in the terminals E of the battery packs S. For example, the engagement members may be screw members to be engaged with the screws formed in the upper portions of the terminals E of the battery packs S. Terminal holes in which the terminals E of the battery packs S are configured to be inserted may be formed in the coupling pieces 11.

The coupling pieces 11 and the connection piece 15 are disposed in different manners. For example, while the coupling pieces 11 are laid flat on the battery packs S, the connection piece 15 stands upright on the battery packs S. In detail, the coupling pieces 11 and the connection piece 15 are coupled to each other in different manners. When the coupling pieces 11 are laid flat, the connection piece 15 stands upright. The coupling pieces 11 and the connection pieces 15 can be formed so as to extend in substantially orthogonal planes.

It is desirable that the coupling pieces 11 tightly contact with the terminals E of the battery packs S and the engagement members between the terminals E of the battery packs S and the engagement members. For this, the coupling pieces 11 are laid flat on the battery packs S. Since the coupling pieces 11 form recharging or discharging pass connected to the terminals E of the battery packs S, coupling solidity between the coupling pieces 11 and the terminals E of the battery packs S affects electrical properties of the recharging or discharging pass, that is, electric resistance characteristics. Accordingly, it is desirable that the coupling pieces 11 and the terminals E of the battery packs S are coupled to each other as firmly as possible while being in close contact with each other.

The connection piece 15 connects the coupling pieces 11 at both ends of the bus bar B and forms recharging or discharging pass between the terminals E of the battery packs S neighboring each other. In this regard, the connection piece 15 forms a connection pass connecting the battery packs S neighboring each other. It is desirable that the connection piece 15 has a smallest possible width in order to avoid physical interference in a connection route and maintain an electrical insulation state while connecting the battery packs S. Accordingly, the connection piece 15 may be disposed to stand upright on the battery packs S.

As shown in FIGS. 1 and 2, the bus bar B may have various forms. For example, the bus bar B may be provided in various forms according to positions and connection methods, such as serial connection and parallel connection, of the battery packs S to be connected by the bus bar B. However, in the present exemplary embodiment, the bus bar B may be provided in several standardized forms, with bus bar B of several standardized forms, the battery packs S may have various forms according to required output capacity.

As shown in FIGS. 3 and 4, guides G11, G12, and G2 for the bus bar B are formed on an upper surface of the battery pack S. For example, the guides G11, G12, and G2 are formed around the terminals E of the battery pack S. As shown in FIG. 3, the guides G11, G12, and G2 may be integrally formed on the upper surface of the battery pack S, that is, on the case C of the battery pack S. The guides G11, G12, and G2 may guide the coupling pieces 11 coupled to the terminals E of the battery packs S or the connection piece 15 extending from the coupling pieces 11. The guides G11, G12, and G2 may protrude from the case C, and may arrange an assembly position of the bus bar B.

In detail, the guides G11, G12, and G2 may be in the form of lines extending in any one direction on the upper surface of the battery pack S. For example, when the upper surface of the battery pack S is in the form of a rectangle including a pair of long side portions (left and right direction) and a pair of short side portions (front and rear direction), the guides G11, G12, and G2 may extend in a direction of the short side portions (front and rear direction) or the long side portions (left and right direction). In detail, the guides G11, G12, and G2 may include a first guide Gil and G12 extending in the direction of the short side portions (front and rear direction) and a second guide G2 extending in the direction of the long side portions (left and right direction).

On the upper surface of the battery pack S, a pair of + and − terminals E having different polarities from each other may be formed. When sides of the + and − terminals E that face each other are referred to as inner sides, a pair of inner first guides G11 may be formed on the inner sides of the + and − terminals E. When sides of the + and − terminals E that face away from each other are referred to as outer sides, a pair of outer first guides G12 may be formed on the outer sides of the + and − terminals E.

The second guide G2 may extend in the direction of the long side portions (left and right direction) between the + and − terminals E. For example, the second guide G2 may be formed around the + and − terminals E and/or between the + and − terminals E. The second guide G2 may guide an assembly position of the bus bar B along with the first guide G11 and G12.

The guides G11, G12, and G2 may guide an assembly position of the bus bar B. For example, the guides G11, G12, and G2 may arrange positions of the coupling pieces 11 or the connection piece 15 of the bus bar B. For example, the guides G11, G12, and G2 may arrange positions of the coupling pieces 11 connected to the terminals E around the terminals E or a position of the connection piece 15 extending from the coupling pieces 11 connected to the terminals E. In this regard, the coupling pieces 11 and the connection piece 15 are disposed in different manners, that is, laid or upright. The guides G11, G12, and G2 may be designed according to fixed positions of the coupling pieces 11 and the connection piece 15.

As shown in FIG. 4, the first guide G11 and G12 may guide assembly positions of the bus bars B crossing along a first position P1 and a second position P2. For example, the first guide G11 and G12 may guide assembly positions of the bus bars B extending in the direction of the short side portions (front and rear direction) of the upper surface of the battery pack S. In this regard, an assembly position of the bus bar B crossing along the first position P1, which is relatively inner, may be guided by the inner first guide G11. An assembly position of the bus bar B crossing along the second position P2, which is relatively outer, may be guided by the outer first guide G12. Meanwhile, the second guide G2 may guide assembly positions of the bus bars B crossing along a third position P3 and a fourth position P4. For example, the second guide G2 may guide assembly positions of the bus bars B extending in the direction of the long side portions (left and right direction) of the upper surface of the battery pack S.

The guides G11, G12, and G2 may be formed on the upper surface of the battery pack S. In this regard, each of the guides G11, G12, and G2 may be formed by a pair of ribs extending side-by-side in the direction of the short side portions (front and rear direction) or the long side portions (left and right direction) of the upper surface of the battery pack S.

As shown in FIGS. 1 and 2, the battery packs S different from each other may be connected to each other in parallel. In this regard, the bus bars B interconnect the + terminals E of identical polarities of the battery packs S neighboring each other and interconnect the − terminals E of identical polarities. For example, considering a first bar B1 from among the bus bars B, the first bar B1 includes one end coupled to the rear terminal E, and the other end extended forward with a guide of the inner first guide Gil formed around the rear terminal E and thus coupled to the front terminal E.

Considering a second bus bar B2, the second bus bar B2 includes one end extending from the terminal E in a second row R2, and the other end guided by the outer first guide G12 formed around the terminal E in the second row R2 and coupled to the terminal E in the first row R1 through the second guides G2 in a first row R1 and the second row R2.

In this regard, the second bus bar B2 may be guided by the outer first guide G12 formed around the terminal E in the second row R2.

As described above, the bus bar B interconnects the terminals E of the battery packs S neighboring each other along an approximately vertically bent pattern. In this regard, the bus bar B is guided by the guides G11, G12, and G2 formed around the terminal E of the battery pack S. Around the terminal E, the first guide G11 and G12 and the second guide G2 extending in the directions of the short side portions (front and rear direction) and the long side portions (left and right direction) that are different from each other are formed. As the bus bar B is guided by the first guide Gil and G12 and the second guide G2 and thus extends in a bent pattern, the bus bar B may interconnect the terminals E of the battery packs S neighboring each other.

Referring to FIG. 3, the guides G11, G12, and G2 may be integrally formed in the case C of the battery pack S. For example, the case C may include a front case C1 and a rear case C2 that are assembled in a direction of facing each other with a plurality of battery cells (not shown) therebetween, and the guides G11, G12, and G2 may be integrally formed in the front case C1 and the rear case C2.

A battery module according to an embodiment may include a plurality of battery packs S aligned in the front and rear direction, and a plurality of battery packs S aligned in two rows R1 and R2 in the left and right direction. The technical scope of the inventive concept is not limited thereto. That is, the battery module may have various structures besides the above-described structure. Meanwhile, a battery module according to an embodiment includes a plurality of bus bars B for connecting different pairs of battery packs S to connect a plurality of battery packs to each other. In an embodiment, an assembly position of at least one of the bus bars B may be regulated by guides G11, G12, and G2.

Referring to FIGS. 1 and 2, a battery module according to an embodiment may further include a master pack M for controlling recharging and discharging operations of a plurality of battery packs S. The master pack M is electrically connected to the battery packs S and thus disposed in recharging and discharging routes. As described above, the battery packs S may have substantially the same structure. Accordingly, various required performances may all be satisfied using the battery packs S having the same structure by using the battery packs S having substantially the same structure and connecting the battery packs S, the number of which is increased or decreased according to required output performance, to each other.

The master pack M may have substantially the same external size as the battery pack S, which is for making an external shape of the entire battery module including the master pack M and the battery pack S more compact. That is, the master pack M and the battery pack S may be connected in various structures, and when external sizes of the master pack M and the battery pack S are substantially the same, dead volume may be reduced in the entire battery module, and thus, the external shape of the entire battery module may become compact.

According to one or more embodiments, there is provided a battery module including a guide for an assembly position of a bus bar in a structure in which a plurality of battery packs are bound together by using the bus bar, thereby facilitating binding the battery packs together and preventing faulty binding.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A battery module comprising:
a bus bar; and
a plurality of battery packs electrically connected to each other by the bus bar,
wherein each of the battery packs comprises a case in which a first guide for guiding an assembly position of the bus bar is formed, and the first guide extends in a first direction around a terminal.
2. The battery module of claim 1, wherein the terminal comprises a pair of first and second terminals having different polarities from each other, and
the first guide comprises inner first guides at inner sides of the pair of first and second terminals, wherein the inner sides are between the pair of first and second terminals having different polarities from each other.
3. The battery module of claim 2, wherein the inner first guides are paired at the inner side of the first terminal and the inner side of the second terminal.
4. The battery module of claim 2, wherein the first guide further comprises outer first guides at outer sides of the pair of first and second terminals.
5. The battery module of claim 4, wherein the outer first guides are paired at the outer side of the first terminal and the outer side of the second terminal.
6. The battery module of claim 1, wherein the first guide integrally protrudes from an upper surface of a battery pack in which the terminal is formed.
7. The battery module of claim 1, wherein, when an upper surface of the battery pack in which the terminal is formed is in the form of a rectangle comprising a pair of short side portions and a pair of long side portions,
the first direction is a direction of the short side portions.
8. The battery module of claim 7, further comprising, when the terminal comprises a pair of first and second terminals having different polarities from each other, a second guide extending, in a direction of the long side portions, between the first and second terminals.
9. The battery module of claim 8, wherein the first and second guides are in the form of lines extending perpendicularly to each other, and
the bus bar interconnects the battery packs neighboring each other along a bent pattern with guides of the first and second guides.
10. The battery module of claim 8, wherein the bus bar is provided in plural, and
an assembly position of at least one selected from the plurality of bus bars is regulated by guides of the first and second guides.
11. The battery module of claim 1, wherein the bus bar comprises:
a pair of coupling pieces respectively coupled to terminals of the battery packs different from each other; and
a connection piece between the pair of coupling pieces.
12. The battery module of claim 11, wherein the coupling pieces are laid flat with respect to an upper surface of the battery pack, and the connection piece stands upright vertically with respect to the upper surface of the battery pack.

13. The battery module of claim 12, wherein, in a state of being laid flat, the coupling pieces are pressed between the terminal of the battery pack and an engagement member engaged with the terminal.

14. The battery module of claim 12, wherein, in a state where the connection piece stands upright vertically, an assembly position of the connection piece is regulated by the first guide.

15. The battery module of claim 1, further comprising a master pack for controlling recharging and discharging operations of the battery packs, wherein the master pack is electrically connected to the battery packs and thus disposed in recharging and discharging routes.

16. The battery module of claim 15, wherein the battery packs have substantially identical structures, and
the master pack is formed having substantially the same shape as that of a surface of a battery pack.

17. A battery module comprising:
a plurality of battery packs wherein each of the battery packs include protrusions that define a first, second and third guides wherein the first and second guide extend in a first direction and the third guide extends in a second direction that intersects the first direction and wherein each of the plurality of battery packs include a first and a second terminal that extends outward from the first surface;
a plurality of bus bars that interconnect terminals of the plurality of batteries, wherein the plurality of bus bars include coupling pieces that are positioned on the first surface so as to extend in the plane of the first surface and a connecting piece that extends between coupling pieces positioned on different battery packs wherein the connecting piece extends in a substantially orthogonal plane than the plane of the first surface; and
wherein the plurality of battery packs have protrusions formed on the first surface so as to define guides and wherein the plurality of bus bars are positioned adjacent the guides.

18. The battery module of claim 17, wherein the terminals have a first and a second surface and plurality of guides include an inner and outer guide that extend in a first direction that are respectively located at the first and second surfaces of the terminals.

19. The battery module of claim 18, wherein the battery packs defines a rectangular shape comprising a pair of short side portions and a pair of long side portions and wherein the inner and outer guide extend in the direction of the short side walls and wherein the second guide extends in the direction of the long side walls.

20. The battery module of claim 17, wherein each of the battery packs have substantially identical structures and wherein the battery module further comprises a master packed that is formed in an external size that is the same as that of the battery packs.

* * * * *